March 4, 1947.   M. H. SWEET   2,417,023

PHOTOELECTRIC ELECTRON MULTIPLIER TUBE PHOTOMETER CIRCUITS

Filed Sept. 15, 1944

INVENTOR.
MONROE H. SWEET
BY
ATTORNEYS

Patented Mar. 4, 1947

2,417,023

UNITED STATES PATENT OFFICE 2,417,023

PHOTOELECTRIC ELECTRON MULTIPLIER TUBE PHOTOMETER CIRCUITS

Monroe Hamilton Sweet, Binghamton, N. Y., assignor to General Aniline & Film Corporation, New York, N. Y., a corporation of Delaware Application September 15, 1944, Serial No. 554,318

18 Claims. (Cl. 250—41.5)

This invention relates to photoelectric electron multiplier tube photometer circuits, and more particularly, to such circuits in which the output or meter current is a logarithmic function of the radiant flux incident on the photo-multiplier tube.

In the photographic and related arts, measurements of the optical characteristics of photographic films and similar samples are of importance in processing. Various expedients have been used to obtain these measurements. For instance, visual type photometers are in general use as well as are photometers employing photoelectric cells and photo-emissive vacuum photo-tubes. Generally, systems employing photoelectric cells and vacuum photo-tubes have been arranged to provide meter readings which are a linear function of the radiant flux incident on the exploring member.

However, in certain instances, the desired scale reading should be logarithmically related to the incident flux. For example, optical density is defined as the logarithm of the reciprocal of the optical transmission. The amount of light reaching the photoelectric cell or photo-tube is a direct function of the optical transmission of the sample. If the output of the measuring circuit is a linear function of the light input thereto, a special logarithmic scale must be used on the meter to obtain direct readings of the optical density of the sample. Such logarithmic scales are badly cramped at the higher densities, impairing the accuracy of the reading obtainable.

In my copending application Serial No. 452,697, filed July 29, 1942, for "Direct reading densitometer," Patent No. 2,406,716, I have described and claimed a measuring circuit using a photo-emissive vacuum photo-tube and an amplifier in which the plate or output current is a logarithmic function of the photo-tube current. This enables the use of an output meter having a uniform scale giving direct readings of optical density of the sample. An important feature of the circuit of said copending application is that of making the grid current of the amplifier identical with the output current of the photo-tube.

While the described densitometer has been satisfactory in practice, its capabilities have been limited by the relatively small output obtainable from the simple photo-emissive type photo-tube. However, there are now available electrostatically focused photo-multiplier tubes having an output several ten thousand-fold greater than that of the simple photo-emissive photo-tube. A typical photo-multiplier tube comprises a photo-emissive cathode, a plurality of multiplier elements known as "dynodes" and an anode. A graduated voltage is impressed across the tube elements resulting in an enormous multiplication of the anode, or output current as compared to that of the simple photo-emissive type photo-tubes.

These photo-multiplier tubes may be coupled to ordinary amplifier circuits in the conventional manner without difficulty. However, when it is attempted to couple a photo-multiplier tube in the circuit of my said copending application, difficulty is encountered due to the polarity inter-relationships of the photo-multiplier tube components and because a source of grid current of substantially infinite impedance is required.

It is among the objects of this invention to provide a direct reading densitometer of greatly increased sensitivity; to provide a radiant energy measuring system including an electron multiplier device logarithmically coupled to an output measuring circuit; to provide a direct reading densitometer employing a photo-multiplier tube; to provide methods of coupling the output of a photo-multiplier tube to an amplifier to obtain an amplifier output logarithmically related to the light incident on the photo-multiplier tube; and to provide a sensitive densitometer having a uniformly graduated meter scale.

These and other objects, advantages and novel features of the invention will be apparent from the following description and accompanying drawing. In the drawing.

Generally speaking, according to the principles of the present invention, the output of a photo-multiplier tube is connected to the grid of an amplifier tube in such a manner that the grid current is a direct function of the light incident upon the photo-multiplier tube cathode. A high impedance is maintained between the grid circuit and ground, as by electrostatically and magnetically shielding the photo-tube anode-to-amplifier grid conductor from ground. Such shielding is preferably metallic and the impedance between the grid circuit and ground is of the order of 10,000 megohms.

The parameters of the amplifier are so selected that the amplifier output current is logarithmically related to the photo-tube-grid current. A meter is connected in the amplifier output circuit so that its readings are a logarithmic function of the light incident on the photo-multiplier-tube cathode. Due to the aforementioned circuit characteristics, the meter may have a uniformly graduated scale. To improve the linearity of meter response, a bucking resistor may be added in the grid circuit and a resistance inserted in the plate circuit.

Figure 1:
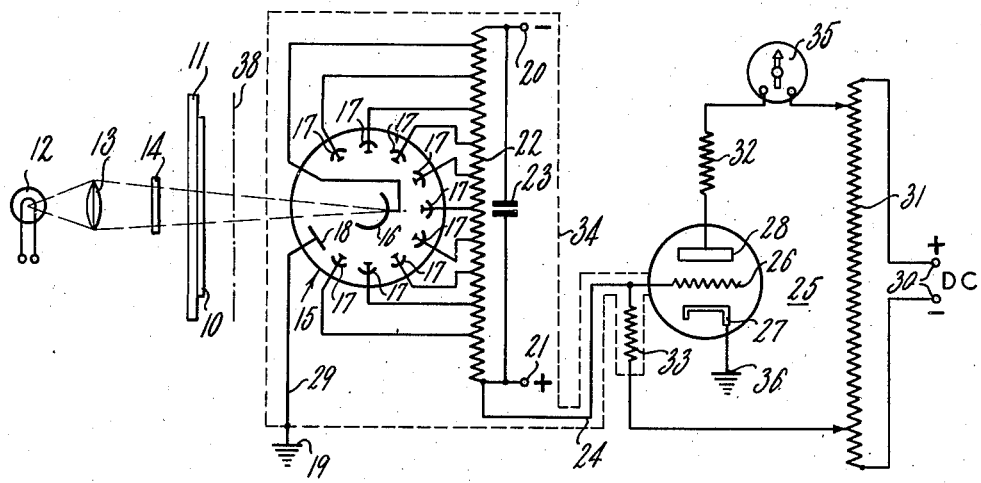
Fig. 1 is a schematic wiring diagram illustrating one embodiment of my invention.

Fig. 1 represents an embodiment of the invention operable with a direct current potential impressed on the photo-multiplier tube components.

As shown, a sample to be measured, such as a film 10 is placed on a suitable transparent support 11 where it receives light directed thereon from a light source 12 through a condensing lens 13 and a suitable filter 14. Light source 12 may be a 15 C. P. auto bulb.

Light passing through sample 10 strikes the photo-emissive cathode 16 of an electrostatically focused, photo-multiplier tube 15, which may be, for example, an RCA type 931A. As will be understood by those skilled in the art, tube 15 comprises, besides cathode 16, a plurality of multiplier elements or dynodes 17 and an anode 18. Dynodes 17 are preferably nine in number, and are so arranged that electrons emitted by cathode 16 successively strike each of the dynodes at a higher potential, releasing an increasing number of electrons therefrom, so that the output current of anode 18 is enormously multiplied as compared with that of a simple photo-emissive photo-tube.

Graduated potentials are applied to the elements of tube 15. In the embodiment shown in Fig. 1, these potentials are obtained from a direct current source 20, 21 through the medium of a voltage divider 22 connected in parallel with a smoothing condenser 23. Preferably, however, the direct current source is a series connected pack of batteries having a potential such as 67½ volts per photo-multiplier stage for the described tube. The direct current source is represented as a potentiometer for convenience of illustration.

Cathode 16 is connected to negative terminal 20 and dynodes 17 are connected to equi-spaced taps on divider 22. Anode 18, which is relatively positive, is grounded at 19 through conductor 29 to prevent hazard due to the relatively high voltage.

The positive terminal 21 of potentiometer 22 is connected by a conductor 24 to the grid 26 of an amplifier tube 25 having a cathode 27, grounded at 36, and an anode 28. A direct current potential is impressed on tube 25 from a source 30 through a potentiometer 31. Plate or anode 28 is connected through a resistance 32 and an ammeter 35 to a point of relatively positive potential on potentiometer 31. A resistor 33 is connected between grid 26 and a relatively negative point on potentiometer 31 to introduce a bucking current effective on relatively small grid currents to improve the linearity of response of meter 35. Metallic shielding indicated by dotted line 34 is placed around tube 15, current source 20, 21, lead 24 and resistor 33. The impedance of the shielding with respect to the shielded components is of the order of 10,000 megohms.

Amplifier grid 26 is connected in electrical series circuit relation with the output of photo-multiplier tube 15. The series circuit includes ground 19, conductor 29, anode 18, the dynode 17 next to anode 18, potentiometer 22, conductor 24, grid 26, amplifier cathode 27 and ground 36. The amplifier grid current is thus identical with the output current of photo-multiplier tube 15 which, in turn, is a direct function of the light incident on photo-multiplier cathode 16. The parameters of the amplifier circuit are such that the amplifier grid potential is a logarithmic function of the grid current. As the amplifier plate or output current is a direct function of the amplifier grid potential, the indications of ammeter 35 are thus logarithmically related to the light reaching cathode 16, which light is a function of the optical transmission of film 10.

The scale of meter 35 is thus uniformly graduated, the logarithmic transformation taking place in the electronic circuit due to the identity between the photo-multiplier tube output current and the amplifier grid current. Grid resistor 33 introduces a relatively small bucking current into the grid circuit to improve the linearity of response of meter 35 on small photo-tube output currents. Plate resistor 32 is similarly effective on large output currents, as fully described in my said copending application.

Figure 2:
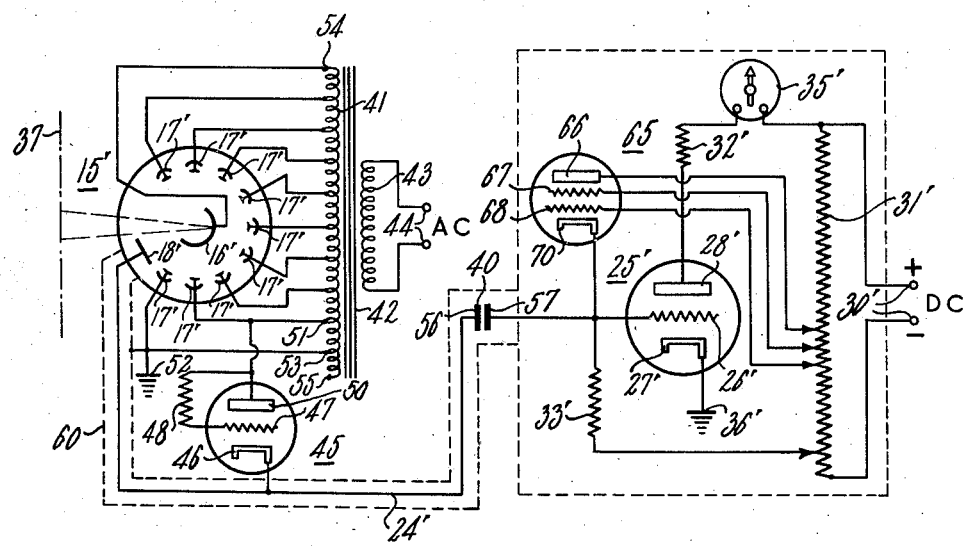
Fig. 2 is a schematic wiring diagram illustrating another embodiment of my invention.

An alternative embodiment of the invention is illustrated in Fig. 2, wherein elements identical with those in the circuit of Fig. 1 have been given the same reference characters primed. The optical system to the left of the broken line 37 has been omitted to simplify the illustration, as it is identical with the optical system to the left of the dotted line 38 in Fig. 1.

In the circuit of Fig. 2, the output of photo-multiplier tube 15' is coupled to the grid 26' of amplifier tube 25' through a condenser 40 so that alternating current signals from tube 15' are amplified by tube 25'. The problem of impressing these alternating current signals from tube 15' on condenser 40 is a difficult one as the range of photo-multiplier tube anode currents to be dealt with is of the order of at least 1000 to 1 and the impedance of the elements connected to conductor 24' must be substantially infinite when no light flux is incident on tube 15'.

The potentials across the tube 15' components are obtained from the multi-tapped secondary winding 41 of a transformer 42 having a primary winding 43 connected to a source of alternating current 44. Anode 18' is not connected directly to transformer 42, but is connected to conductor 24'. A thermionic vacuum tube 45 has its cathode 46 connected to conductor 24' and thus to anode 18'. Grid 47 of tube 45 is connected through a resistance 48 to anode 50 of tube 45, thus obtaining the necessary grid bias. Anode 50 is connected, in common with the second last dynode 17' to tap 51 of winding 41. The last dynode 17' is grounded at 52 and connected to tap 53 of winding 41. Conductor 24' and condenser 40 are electrostatically and magnetically shielded as indicated by broken line 60 with a high impedance to ground.

The described arrangement operates in the following manner. During the half cycle of alternating current when terminal 54 of winding 41 is positive with respect to terminal 55 thereof, the relative polarity of the electrodes of tube 15' is such that no anode current will flow even though light is incident upon cathode 16'. At the same time tap 51 is positive with respect to tap 53, and thus tube 45 will be potentially conductive. Thus, if conductor 24' and its connected elements have previously assumed an appreciable negative potential with respect to tap 51, current will be conducted by tube 45 until the potential of conductor 24', and its connected elements, such as anode 18' and plate 56, equals that of tap 51. Plate 56 of condenser 40 will thus assume a relatively positive potential.

During the succeeding half cycle of alternating current, terminal 54 will be relatively negative with respect to terminal 55. If light is incident upon cathode 16' of tube 15', an anode current will flow. At the same time, tap 51 will be relatively negative with respect to tap 53, and tube 45 will thus act as a substantially infinite impedance between anode 18' and ground 52.

If anode current flows through tube 15', the potential of plate 56 of condenser 40 will be changed to a more negative value, thus tending to make grid 26' of amplifier 25' more negative. However, if grid 26' is at or slightly more negative than its critical negative potential, current will flow through pentode tube 65, in a manner described hereinafter, and will block any further change of the potential of grid 26' in a negative direction.

During the next succeeding half cycle, terminal 54 is again relatively positive with respect to terminal 55 and tube 15' is non-conductive, as previously explained. Tube 45 again passes current, restoring conductor 24', anode 18' and condenser plate 56 to their former potential. The change of potential is such as to induce a more positive potential on grid 26' of amplifier tube 25'. Also the restoring current must be approximately equal to the anode current discharging condenser 40 during the immediately preceding half cycle.

As the anode current of tube 15' is a direct function of the incident light flux, and as the grid current of tube 25' is equal to the anode current of tube 15', the grid current bears a direct relation to the light flux incident on cathode 16' of tube 15'. The grid potential, and thus the plate current, of tube 25' is a logarithmic function of the grid current thereof. Thus, meter 35' indicates the logarithm of the light flux incident on tube 15'.

The alternating current signal from condenser 40 is transmitted to grid 26' of amplifier tube 25'. Ordinarily, continued transmission of such alternating current signals would cause the mean absolute potential of grid 26' to assume such a value that its peak positive potential would stabilize at the critical potential for which grid current begins to flow in tube 25'. In this connection, grid resistor 33' plays no part in the performance of the circuit when relatively large grid currents are involved. Thus, the plate 57 of condenser 40, which is common with grid 26' would pass current through grid 26' for only one or two cycles. Thereafter, the grid potential would assume a value at which no current flows in the grid circuit.

To prevent these conditions and provide for successful operation, pentode tube 65 is connected in the grid circuit to block the grid potential at its critical value and present an infinite impedance between grid 26' and cathode 27' at all grid potentials more positive than the critical value. Anode 66, screen grid 67 and control grid 68 are connected to potentiometer 31' at potentials which cause tube 65 to present a low impedance when the cathode 70 of tube 65 reaches the critical negative potential of grid 26' of tube 25'. At all potentials of grid 26' more positive than the critical value, the potential of cathode 70 of pentode 65 will be such that pentode 65 presents an infinite impedance between grid 26' and potentiometer 31'.

Consequently, when an alternating current signal is impressed on condenser 40, the peak negative potential of grid 26' is prevented by pentode 65 from assuming a value more negative than the critical negative potential. Thus pentode 65 acts as a block to continued increase in a negative direction beyond the critical value of the potential of grid 26'. In all other respects, the circuit operates as though pentode 65 were not included therein.

The arrangement of Fig. 2 has advantages over the arrangement of Fig. 1 in that it does not require a battery pack and the requisite grid circuit impedance to ground is not so difficult to maintain. However, the arrangement of Fig. 2 is somewhat less sensitive, under normal conditions, than the arrangement of Fig. 1.

While specific embodiments of the invention have been shown and described in detail to illustrate the application of the principles thereof, it will be apparent that the invention may be otherwise embodied without departing from such principles.

What is claimed is:

1. An electronic radiant energy measuring system comprising, in combination, a source of radiant energy; a radiant energy sensitive electronic-multiplier device including a plurality of multiplier elements operatively associated with such source, and having a conductivity directly dependent upon the amount of radiant energy reaching said device from said source of radiant energy; voltage means in circuit connection with said multiplier elements of said device and operative to impress graduated potentials across said elements; an electronic amplifier tube having parameters such that the grid potential and thus the output current thereof are a logarithmic function of the input circuit current; circuit means connecting the grid circuit of said amplifier tube in series circuit relation with the output of said electronic-multiplier device such that the grid current of said amplifier tube equals the output current of said device, which output current varies directly as the amount of radiant energy reaching said device; a current measuring meter connected in series circuit relation with the output circuit of said amplifier tube, whereby the indications of said meter are a logarithmic function of the radiant energy incident upon said electronic-multiplier device; and high impedance means shielding the output circuit of said device and the input circuit of said amplifier tube.

2. An electronic radiant energy measuring system comprising, in combination, a source of radiant energy; a radiant energy sensitive photo-multiplier device operatively associated with such source, and having a radiant energy sensitive cathode, a plurality of multiplier dynodes and an anode; said photo-multiplier device having a conductivity directly dependent upon the amount of radiant energy reaching said device from said source of radiant energy, voltage means in circuit connection with said multiplier dynodes of said device and operative to impress graduated potentials across said multiplier dynodes; an electronic amplifier tube having parameters such that the grid potential and thus the output current thereof are a logarithmic function of the grid current; circuit means connecting the input circuit of said amplifier tube in series circuit relation with the output of said photo-multiplier device such that the grid current of said amplifier tube equals the output current of said device which output current varies directly as the amount of radiant energy reaching said device; an ammeter connected in series circuit relation with the output circuit of said tube, whereby the indications of said meter are a logarithmic function of the radiant energy reaching said electronic multiplier device; and high impedance means shielding the output circuit of said device and the input circuit of said amplifier tube.

3. An electronic light measuring system comprising, in combination, a source of light; a light sensitive photo-multiplier device including a plurality of multiplier elements operatively associated with such source, and having a conductivity directly dependent upon the amount of light reaching said device from said source of light; voltage means in circuit connection with said multiplier elements of said device and operative to impress graduated potentials across said elements; an electronic amplifier tube having parameters such that the grid potential and thus the output current thereof are a logarithmic function of the grid current; circuit means connecting the input circuit of said amplifier tube in series circuit relation with the output of said photo-multiplier device such that the grid current of said amplifier tube equals the output current of said device, which output current varies directly as the amount of light reaching said device; a current measuring meter connected in series circuit relation with the output circuit of said tube, whereby the indications of said meter are a logarithmic function of the light reaching said photo-multiplier device; and high impedance means shielding the output circuit of said device and the input circuit of said amplifier tube.

4. An electronic light measuring system comprising, in combination, a source of light; a light sensitive photo-multiplier device including a plurality of multiplier elements operatively associated with such source, and having a conductivity directly dependent upon the amount of light reaching said device from said source of light; voltage means in circuit connection with said multiplier elements of said device and operative to impress graduated potentials across said elements; an electronic amplifier tube having parameters such that the grid potential and thus the output current thereof are a logarithmic function of the grid current; circuit means connecting the input circuit of said amplifier tube in series circuit relation with the output of said photo-multiplier device such that the grid current of said amplifier tube equals the output current of said device, which output current varies directly as the amount of light reaching said device; a current measuring meter connected in series circuit relation with the output circuit of said tube, whereby the indications of said meter are a logarithmic function of the light reaching said photo-multiplier device; and electrical shielding means enclosing said device, said voltage means and said circuit means.

5. An electronic light measuring system comprising, in combination, a source of light; a light sensitive photo-multiplier device including a plurality of multiplier elements operatively associated with such source, and having a conductivity directly dependent upon the amount of light reaching said device from said source of light; voltage means in circuit connection with said multiplier elements of said device and operative to impress graduated potentials across said elements; an electronic amplifier tube having parameters such that the grid potential and thus the output current thereof are a logarithmic function of the grid current; circuit means connecting the input circuit of said amplifier tube in series circuit relation with the output of said photo-multiplier device such that the grid current of said amplifier tube equals the output current of said device, which output current varies directly as the amount of light reaching said device; a current measuring meter connected in series circuit relation with the output circuit of said tube, whereby the indications of said meter are a logarithmic function of the light reaching said photo-multiplier device; electric means for introducing a bucking current into the grid circuit of said amplifier tube in opposition to the current from said device; and high impedance means shielding the output circuit of said device and the input circuit of said amplifier tube.

6. An electronic light measuring system comprising, in combination, a source of light; a light sensitive photo-multiplier device including a plurality of multiplier elements operatively associated with such source, and having a conductivity directly dependent upon the amount of light reaching said device from said source of light; voltage means in circuit connection with said multiplier elements of said device and operative to impress graduated potentials across said elements; an electronic amplifier tube having parameters such that the grid potential and thus the output current thereof are a logarithmic function of the grid current; circuit means connecting the grid of said amplifier tube in series circuit relation with the output of said photo-multiplier device such that the grid current of said amplifier tube equals the output current of said device, which output current varies directly as the amount of light reaching said device; a current measuring meter connected in series circuit relation with the output circuit of said tube, whereby the indications of said meter are a logarithmic function of the light reaching said photo-multiplier device; electric means for introducing a bucking current into the grid circuit of said amplifier in opposition to the current from said device; and electrical shielding means enclosing said device, said voltage means, said circuit means and said electric means.

7. An electronic light measuring system comprising, in combination, a source of light; a light sensitive photo-multiplier device operatively associated with such source, and having a light sensitive cathode, a plurality of multiplier dynodes and an anode; said photo-multiplier device having a conductivity directly dependent upon the amount of light reaching said device from said source of light; voltage means in circuit connection with said multiplier dynodes of said device and operative to impress graduated potentials across said multiplier dynodes; an electronic amplifier tube having parameters such that the grid potential and thus the output current thereof are a logarithmic function of the grid current; circuit means connecting the grid of said amplifier tube in series circuit relation with the output of said photo-multiplier device such that the grid current of said amplifier tube equals the output current of said device, which output current varies directly as the amount of light reaching said device; an ammeter connected in series circuit relation with the output circuit of said tube, whereby the indications of said meter are a logarithmic function of the light reaching said photomultiplier device.

8. An electronic light measuring system comprising, in combination, a source of light; a photo-multiplier device operatively associated with said light source and having a cathode sensitive to light radiated from said light source, a plurality of multiplier dynodes and an anode, said device having a conductivity directly dependent upon the amount of light reaching said cathode from said source of light; a first source of direct current; circuit means connected to said current source and to said multiplier dynodes of said device for applying uniform potentials from said source across said multiplier dynodes; an electronic amplifier tube having parameters such that the grid potential and thus the output current thereof are a logarithmic function of the grid current; a second source of direct current; electric means including circuit connections for impressing a potential from said second direct current source on the output of said amplifier tube; a conductor connecting the positive terminal of said first direct current source to the grid of said amplifier tube, whereby the grid current of said amplifier tube equals the output current of said device, which output current will vary as a direct function of the amount of light reaching said cathode; an ammeter connected in series circuit relation with the output circuit of said tube, whereby the indications of said meter are a logarithmic function of the light reaching said photo-multiplier device; and means electrically shielding said photo-multiplier device, said first direct current source, said circuit means and said conductor.

9. An electronic light measuring system comprising, in combination, a source of light; a photo-multiplier device operatively associated with said light source and having a cathode sensitive to light radiated from said light source, a plurality of multiplier dynodes and an anode, said device having a conductivity directly dependent upon the amount of light reaching said cathode from said source of light; a first source of direct current; circuit means connected to said current source and to said multiplier dynodes of said device for applying uniform potentials from said source across said multiplier dynodes; an electronic amplifier tube having parameters such that the grid potential and thus the output current thereof are a logarithmic function of the grid current; a second source of direct current; electric means including circuit connections for impressing a potential from said second direct current source on the output of said amplifier tube; a conductor connecting the positive terminal of said first direct current source to the grid of said amplifier tube, whereby the grid current of said amplifier tube equals the output current of said device, which output current will vary as a direct function of the amount of light reaching said cathode; a resistor connected between a point of relatively negative potential of said second direct current source and the grid of said amplifier tube; and an ammeter connected in series circuit relation with the output circuit of said tube, whereby the indications of said meter are a logarithmic function of the light reaching said photo-multiplier device.

10. An electronic light measuring system comprising, in combination, a source of light; a photo-multiplier device operatively associated with said light source and having a cathode sensitive to light radiated from said light source, a plurality of multiplier dynodes and an anode, said device having a conductivity directly dependent upon the amount of light reaching said cathode from said source of light; a first source of direct current; circuit means connected to said current source and to said multiplier dynodes of said device for applying uniform potentials from said source across said multiplier dynodes; an electronic amplifier tube having parameters such that the grid potential and thus the output current thereof are a logarithmic function of the grid current; a second source of direct current; electric means including circuit connections for impressing a potential from said second direct current source on the output of said amplifier tube; a conductor connecting the positive terminal of said first direct current source to the grid of said amplifier tube, whereby the grid current of said amplifier tube equals the output current of said device which output current will vary as a direct function of the amount of light reaching said cathode; a resistor connected between a point of relatively negative potential of said second direct current source and the grid of said amplifier tube; an ammeter connected in series circuit relation with the output circuit of said tube, whereby the indications of said meter are a logarithmic function of the light reaching said photo-multiplier device; and means electrically shielding said photo-multiplier device, said first direct current source, said circuit means, said conductor and said resistor.

11. An electronic light measuring system comprising, in combination, a source of light, a photo-multiplier device operatively associated with said light source and having a cathode sensitive to light radiated from said light source, a plurality of multiplier dynodes and an anode, said device having a conductivity directly dependent upon the amount of light reaching said cathode from said source of light; a first source of direct current; circuit means connected to said current source and to said multiplier dynodes of said device for applying uniform potentials from said source across said multiplier dynodes; an electronic amplifier tube having parameters such that the grid potential and thus the output current thereof are a logarithmic function of the grid current; a second source of direct current; electric means including circuit connections for impressing a potential from said second direct current source on the output of said amplifier tube; a conductor connecting the positive terminal of said first direct current source to the grid of said amplifier tube, whereby the grid current of said amplifier tube equals the output current of said device, which output current will vary as a direct function of the amount of light reaching said cathode; a resistor connected between a point of relatively negative potential of said second direct current source and the grid of said amplifier tube; an ammeter connected in series circuit relation with the output circuit of said tube, whereby the indications of said meter are a logarithmic function of the light reaching said photo-multiplier device; means electrically shielding said photo-multiplier device, said first direct current source, said circuit means, said conductor and said resistor; and a plate resistor connected in electric series circuit relation with said ammeter to improve the linearity of response thereof.

12. An electronic light measuring system comprising, in combination, a source of light; a light sensitive photo-multiplier device including a plurality of multiplier elements operatively associated with such source, and having a conductivity directly dependent upon the amount of light reaching said device from said source of light; a source of alternating current, circuit means connected to said current source and to said multiplier elements of said device for applying graduated potentials from said source across said elements; an electronic amplifier tube having parameters such that the grid potential and thus the output current thereof are a logarithmic function of the grid current; circuit means connecting the grid of said amplifier tube in series circuit relation with the output of said photo-multiplier device to conduct anode current pulses of said photo-multiplier device to the grid of said amplifier tube whereby the grid current of said amplifier tube equals the output current of said device, which output current varies directly as the amount of radiant energy reaching said device; a current measuring meter connected in series circuit relation with the output circuit of said tube, whereby the indications of said meter are a logarithmic function of the light reaching said photo-multiplier device; and high impedance means shielding the output circuit of said device and the input circuit of said amplifier tube.

13. An electronic light measuring system comprising, in combination, a source of light, a photo-multiplier device operatively associated with said light source and having a cathode sensitive to light radiated from said light source, a plurality of multiplier dynodes and an anode, said device having a conductivity directly dependent upon the amount of light reaching said cathode from said source of light; a source of alternating current; circuit means connected to said current source and to said multiplier dynodes of said device for applying graduated potentials from said source across said multiplier dynodes; an electronic amplifier tube having parameters such that the grid potential and thus the output current thereof are a logarithmic function of the grid current; a condenser coupling the anode of said device to the grid of said amplifier tube to conduct anode current pulses of said photo-multiplier device to the grid of said amplifier tube whereby the grid current of said amplifier tube equals the output current of said device, which output current will vary as a direct function of the amount of light reaching said cathode; and an ammeter connected in series circuit relation with the output circuit of said tube, whereby the indications of said meter are a logarithmic function of the light reaching said photo-multiplier device.

14. An electronic light measuring system comprising, in combination, a source of light; a photo-multiplier device operatively associated with said light source and having a cathode sensitive to light radiated from said light source, a plurality of multiplier dynodes and an anode, said device having a conductivity directly dependent upon the amount of light reaching said cathode from said source of light; a source of alternating current; circuit means connected to said current source and to said multiplier dynodes of said device for applying graduated potentials from said source across said multiplier dynodes; an electronic amplifier tube having parameters such that the grid potential and thus the output current thereof are a logarithmic function of the grid current; a condenser coupling the anode of said device to the grid of said amplifier tube to conduct anode current pulses of said photo-multiplier device to the grid of said amplifier tube whereby the grid current of said amplifier tube equals the output current of said device, which output current will vary as a direct function of the amount of light reaching said cathode; a rectifying device having a negative terminal connected to said anode and said condenser and a positive terminal connected to the dynode next but one to said anode whereby, during the half cycle when said anode is relatively negative, said rectifying device will pass current to increase the positive potential of said condenser and, when said anode is relatively positive, said rectifying device will act as a substantially infinite impedance; and an ammeter connected in series circuit relation with the output circuit of said tube, whereby the indications of said meter are a logarithmic function of the light reaching said photo-multiplier device.

15. An electronic light measuring system comprising, in combination, a source of light; a photo-multiplier device operatively associated with said light source and having a cathode sensitive to light radiated from said light source, a plurality of multiplier dynodes and an anode, said device having a conductivity directly dependent upon the amount of light reaching said cathode from said source of light; a source of alternating current; circuit means connected to said current source and to said multiplier dynodes of said device for applying graduated potentials from said source across said multiplier dynodes; an electronic amplifier tube having parameters such that the grid potential and thus the output current thereof are a logarithmic function of the grid current; a condenser coupling the anode of said device to the grid of said amplifier tube to conduct anode current pulses of said photo-multiplier device to the grid of said amplifier tube whereby the grid current of said amplifier tube equals the output current of said device, which output current will vary as a direct function of the amount of light reaching said cathode; a triode having its cathode connected to the anode of said photo-multiplier device and said condenser, and its anode and grid connected to the dynode next but one to said photo-multiplier anode whereby, during the half cycle when said photo-multiplier anode is relatively negative, said triode will pass current to increase the positive potential of said condenser and, when said photo-multiplier anode is relatively positive, said triode will act as a substantially infinite impedance; and an ammeter connected in series circuit relation with the output circuit of said tube, whereby the indications of said meter are a logarithmic function of the light reaching said photo-multiplier device.

16. An electronic light measuring system comprising, in combination, a source of light; a photo-multiplier device operatively associated with said light source and having a cathode sensitive to light radiated from said light source, a plurality of multiplier dynodes and an anode, said device having a conductivity directly dependent upon the amount of light reaching said cathode from said source of light; a source of alternating current; circuit means connected to said current source and to said multiplier dynodes of said device for applying graduated potentials from said source across said multiplier dynodes; an electronic amplifier tube having parameters such that the grid potential and thus the output current thereof are a logarithmic function of the grid current; a source of direct current; a potentiometer in circuit connection with said direct current source and said amplifier tube for adjustably applying a potential from said direct current source to said amplifier tube; a condenser coupling the anode of said device to the grid of said amplifier tube to conduct anode current pulses of said photo-multiplier device to the grid of said amplifier tube whereby the grid current of said amplifier tube equals the output current of said device which output current will vary as a direct function of the amount of light reaching said cathode; a triode having its cathode connected to the anode of said photo-multiplier device and said condenser, and its anode and grid connected to the dynode next but one to said photo-multiplier anode whereby, during the half cycle when said photo-multiplier is relatively negative, said triode will pass current to increase the positive potential of said condenser and, when said photo-multiplier anode is relatively positive, said triode will act as a substantially infinite impedance; electric means connected between the grid of said amplifier tube and said potentiometer and operative to maintain the grid of said tube at a predetermined positive potential; and an ammeter connected in series circuit relation with the output circuit of said amplifier tube, whereby the indications of said meter are a logarithmic function of the light reaching said photo-multiplier device.

17. An electronic light measuring system comprising, in combination, a source of light; a photo-multiplier device operatively associated with said light source and having a cathode sensitive to light radiated from said light source, a plurality of multiplier dynodes and an anode, said device having a conductivity directly dependent upon the amount of light reaching said cathode from said source of light; a source of alternating current; circuit means connected to said current source and to said multiplier dynodes of said device for applying graduated potentials from said source across said multiplier dynodes; an electronic amplifier tube having parameters such that the grid potential and thus the output current thereof are a logarithmic function of the grid current; a source of direct current; a potentiometer in circuit connection with said direct current source and said amplifier tube for adjustably applying a potential from said direct current source to said amplifier tube; a condenser coupling the anode of said device to the grid of said amplifier tube to conduct anode current pulses of said photo-multiplier device to the grid of said amplifier tube whereby the grid current of said amplifier tube equals the output current of said device which output current will vary as a direct function of the amount of light reaching said cathode; a triode having its cathode connected to the anode of said photo-multiplier device and said condenser, and its anode and grid connected to the dynode next but one to said photo-multiplier anode whereby, during the half cycle when said photo-multiplier anode is relatively negative, said triode will pass current to increase the positive potential of said condenser and, when said photo-multiplier anode is relatively positive, said triode will act as a substantially infinite impedance; a multi-grid electronic device having its anode and grids connected to points of relatively positive potential on said potentiometer and its cathode connected to the grid of said amplifier tube whereby, when the potential of said amplifier-tube grid falls below a predetermined value, said electronic device will become conductive and pass current to restore the potential of said amplifier tube grid and, when the potential of said amplifier tube grid exceeds such predetermined value, said electronic device will act as a substantially infinite impedance; and an ammeter connected in series circuit relation with the output circuit of said tube, whereby the indications of said meter are a logarithmic function of the light reaching said photo-multiplier device.

18. An electronic light measuring system comprising, in combination, a source of light; a photo-multiplier device operatively associated with said light source and having a cathode sensitive to light radiated from said light source, a plurality of multiplier dynodes and an anode, said device having a conductivity directly dependent upon the amount of light reaching said cathode from said source of light; a source of alternating current; circuit means connected to said current source and to said multiplier dynodes of said device for applying graduated potentials from said source across said multiplier dynodes; an electronic amplifier tube having parameters such that the grid potential and thus the output current thereof are a logarithmic function of the grid current; a source of direct current; a potentiometer in circuit connection with said direct current source and said amplifier tube for adjustably applying a potential from said direct current source to said amplifier tube; a condenser coupling the anode of said device to the grid of said amplifier tube to conduct anode current pulses of said photo-multiplier device to the grid of said amplifier tube whereby the grid current of said amplifier tube will vary as a direct function of the amount of light reaching said cathode; a triode having its cathode connected to the anode of said photo-multiplier device and said condenser, and its anode and grid connected to the dynode next but one to said photo-multiplier anode whereby, during the half cycle when said photo-multiplier anode is relatively negative, said triode will pass current to increase the positive potential of said condenser and, when said photo-multiplier anode is relatively positive, said triode will act as a substantially infinite impedance; a multi-grid electronic device having its anode and grids connected to points of relatively positive potential on said potentiometer and its cathode connected to the grid of said amplifier tube whereby, when the potential of said amplifier tube grid falls below a predetermined value, said electronic device will become conductive and pass current to restore the potential of said amplifier-tube grid and, when the potential of said amplifier tube grid exceeds such predetermined value, said electronic device will act as a substantially infinite impedance; a resistor connected between the grid of said amplifier tube and a point of relatively negative potential on said potentiometer; and an ammeter connected in series circuit relation with the output circuit of said tube, whereby the indications of said meter are a logarithmic function of the light reaching said photo-multiplier device.

MONROE HAMILTON SWEET.

REFERENCES CITED

The following references are of record in the file of this patent:

UNITED STATES PATENTS

| Number | Name | Date |
| --- | --- | --- |
| 1,653,694 | Branson | Dec. 27, 1927 |
| 2,290,775 | Snyder, Jr. | July 21, 1942 |

OTHER REFERENCES

Article by John Russell, pages 495–6, Rev. of Scien. Instr., Dec. 1937, vol. 8.

Article by Larson & Salingers, pages 226–229, Rev. Scien. Instr., July 1940, vol. 11.